United States Patent
Colin

[15] 3,669,166
[45] June 13, 1972

[54] FILTER CHANGING DEVICE

[72] Inventor: Roger Colin, Orthez, France
[73] Assignee: Societe Anonyme dite: Aquitaine-Organico, Courbevoie, France
[22] Filed: Dec. 4, 1970
[21] Appl. No.: 95,091

[30] Foreign Application Priority Data

March 10, 1970 France..............................7008543

[52] U.S. Cl..............................................146/174, 18/12 B
[51] Int. Cl. .........................................................B29f 3/00
[58] Field of Search.................146/173, 174, 175; 18/12 B; 210/341

[56] References Cited

UNITED STATES PATENTS 3,243,849  4/1966  Joukainen..............................18/12 B
3,455,357  7/1969  Zink......................................146/174

Primary Examiner—Willie G. Abercrombie
Attorney—Bacon & Thomas

[57] ABSTRACT

The device includes two coaxial filters in a cylindrical body positioned in the flow line perpendicular to the direction of discharge of a plastic extruder. By merely rotating the cylindrical body on its axis, one of the filters is connected with the extruder discharge while the other filter is disconnected from the extruder discharge and may be opened for cleaning by removing an end plug.

8 Claims, 7 Drawing Figures

INVENTOR
ROGER COLIN
BY Baron & Thomas
ATTORNEYS

FILTER CHANGING DEVICE

The present invention concerns a filter changing apparatus, particularly one permitting a change of filter at the exit of an extruder of plastic material without necessitating an interruption or even a discernible diminuation of the flow of plastic material.

The presence of a filter on an extruder of plastic material is necessary when there is reason to retain the solid impurities accompanying the extruded matter. When the filter becomes clogged, it is necessary to change it, and until now, this operation usually involved a more or less prolonged interruption of the flow of plastic material, this interruption resulting in a break in the flow of extruded matter, very prejudicial in many cases.

One of the prior practical solutions eliminates the need for the interruption of the flow and consists in using two coaxial filters on an axis perpendicular to the axis of the extruder and lodged in a prismatical or cylindrical filter holder capable of a rectilinear movement along the axis of the filters, the said filter holder comprising adjacent lines of feed and of discharge, permitting one to put into operation or to withdraw from the circuit either one of the two filters. The centers of the orifices of the feed lines adjacent to the filters are situated essentially on the same generatrix of the cylinder or of the prism, constituting the filter holder, and a movement of rectilinear translation can put in communication with the extruder's orifice of discharge one or the other of the orifices of the feed lines from the filters. The same arrangement is found at the exit of the filters, and the same movement of translating having served to interchange the input orifices of the filters puts in communication the output orifice of the filter just put into operation with the input orifice of the extrusion die.

However, the device which has just been described presents several difficulties. The arrangement of the filters might cause significant losses of heat. To guard against this, it is necessary to enlarge the filter holder or to provide auxiliary hating. If one seeks to augment the surfaces of contact between the filter holder and its guiding member for the purpose of improving the transmission of heat, there is at the same time an increase in the forces of friction opposing the movement of the filter holder and recourse to a work jack becomes necessary to effect it. It is to be noted that the displacement of the filter holder is moved out of the guiding member and is thus one of the causes of the increased thermal imbalance between the two filters.

The purpose of the present invention is to remedy the above cited inconvenience by providing a filter changing device limiting the heat losses, this device being unbulky and easily manipulated.

According to the present invention, the filter changing device for extruders of plastic material, comprising two coaxial filters on an axis perpendicular to the axis of the extruder and lodged in a filter body inserted between the extruder and its die, the two filters being provided with adjacent lines of feed and of discharge, permitting the introduction into the path of flow or the removal from it of either one of the two filters, is characterized in that the two filters are machined in a cylinder of revolution and in that the input sections of the adjacent lines of feed and the output sections of the adjacent lines of discharge have their centers located essentially in the same right-hand section of the said cylinder of revolution, the said sections of input and of output corresponding to each of the filters being respectively placed in such a way as to coincide by angular displacement with the line of the filter body which receives the plastic material issuing from the extruder, and with the line of the filter body assuring the movement of the plastic material toward the die.

According to another characteristic of the present invention, the carrying surfaces on the filter body of the cylinder of revolution comprising the two filters is limited to the end and median portions of the said cylinder, the path of the plastic material having traveled the filters being thus partially delineated by the interior wall of the filter body.

In order to make the invention better understood, there will be described an embodiment of the filter changing device with the aid of the attached drawings in which.

Figure 1:
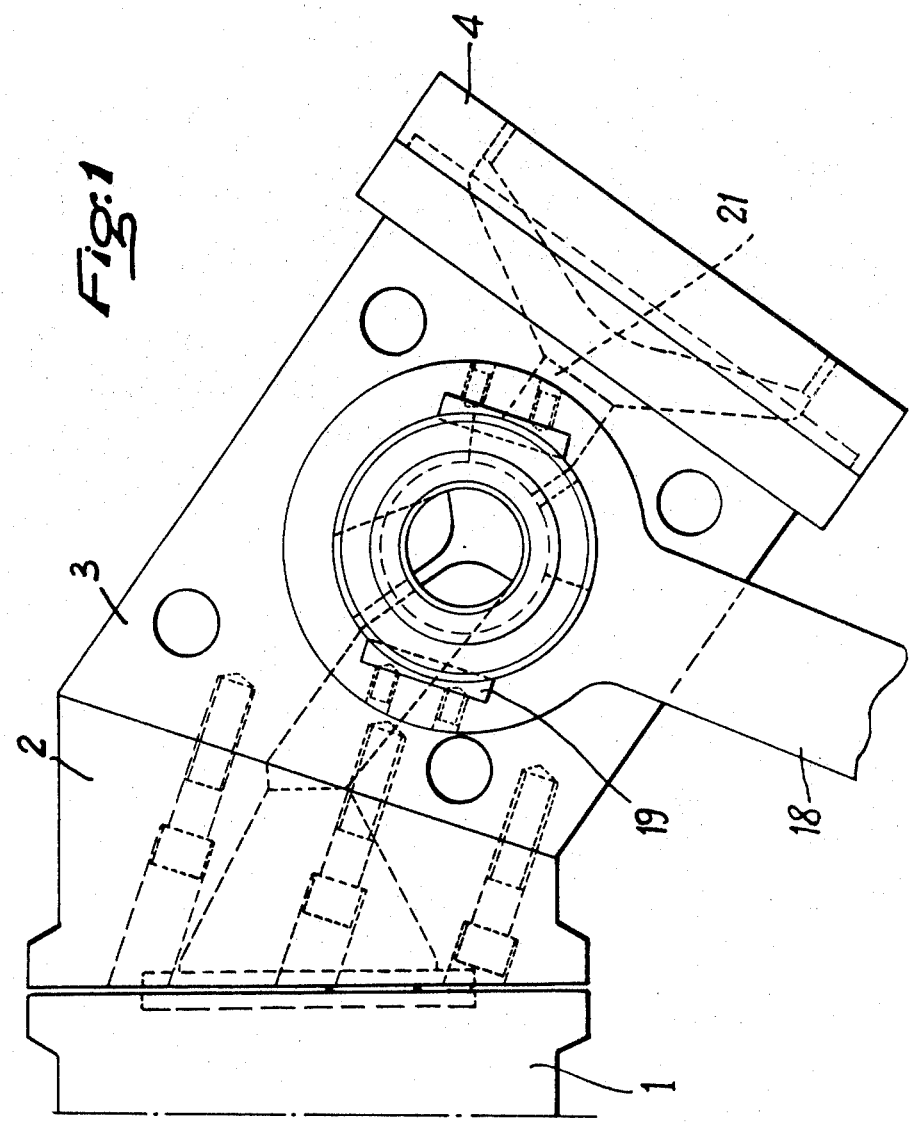
FIG. 1 is a lateral view showing the body of the filter inserted between the extruder and the die.

In FIG. 1, one can see end 1 of the body of an extruder to which, through the intermediary of an optional connecting member 2 in the shape of a corner, is connected the filter body 3. To the filter body is attached a conventional die 4.

Referring now to FIGS. 2–6, the filter body 3 is traversed by a bore in which the cylinder or barrel 5 comprising the two filters 6 and 7 is held. These two filters are made up of holes, of a diameter of 2 mm. for example, pierced into the small diameter portions of the barrel and covered internally with a metallic cloth 8 of a fineness chosen according to the nature of the impurities to be filtered. The filter situated to the left in FIG. 2 comprises a feed line 9 and a discharge line 10. In the same way, the filter to the right comprises a feed line 11 and a discharge line 12. The ends of the filters opposite the lines comprise plugs 13 kept in place by screws 14 provided with locking means 15 destined to facilitate the extraction of the plugs 13 from their place. Towards the ends or at a single end of the barrel are some grooves 16, destined to receive metal rings for locating the barrel in the correct position, the flats 17 formed on one end of the filter housing 5, permit the secure attaching of lever 18 by means of the keys 19.

Figure 2:
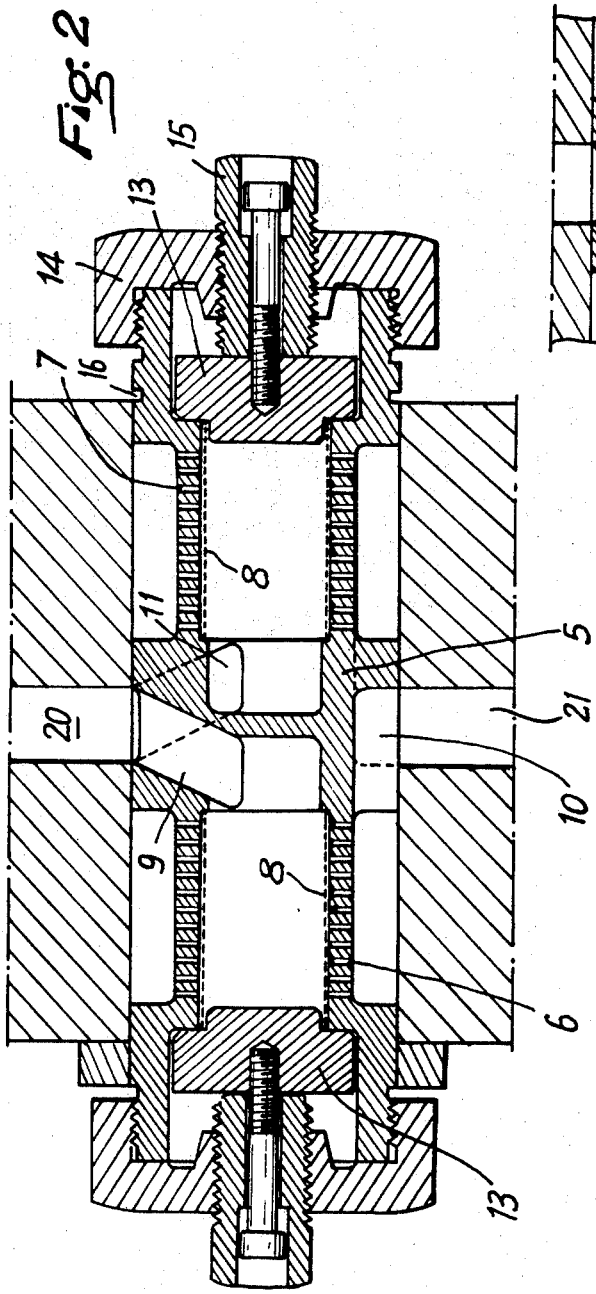
FIG. 2 is a sectional view of the two filters and their mode of introduction into the flow of plastic material.
Figure 2A:
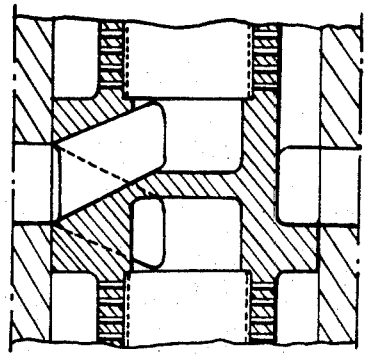
FIG. 2A, shows the position of the filters after the change of filter.
Figure 3:
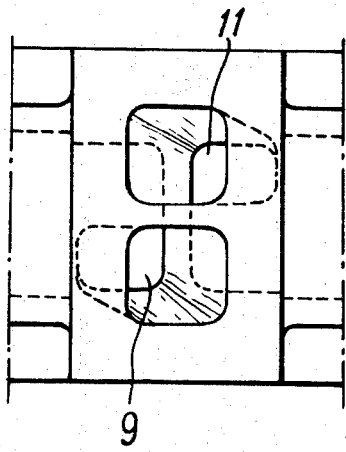
FIG. 3 is a top plan view of the median portion of the cylinder of revolution or barrel comprising the two filters, showing their adjacent lines of feed.
Figure 4:
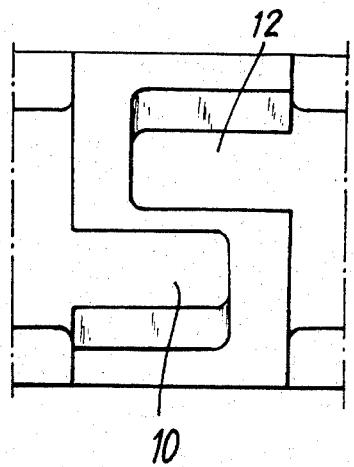
FIG. 4 is a bottom plane view of the median portion of the barrel.
Figure 5:
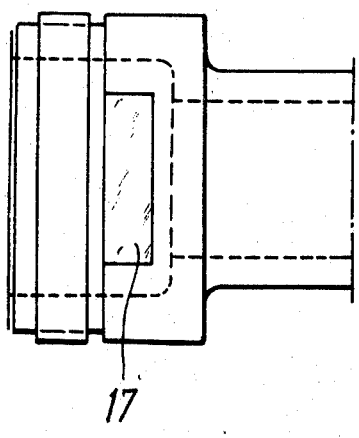
FIG. 5 shows an end of the barrel to which can be attached a displacement lever.
Figure 6:
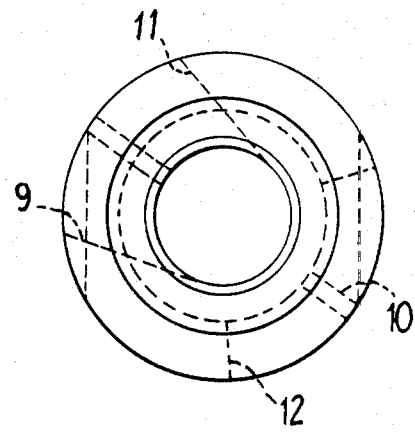
FIG. 6 is a view showing the relative position of the lines of feed and of discharge.

The operation of this filter changing device is as follows: as shown in FIG. 2 where the left filter is in operation, the plastic material issuing from extruder 1 and flowing from line 20 of the filter body 3 penetrates to the interior of filter 6 through feed line 9. Having passed through the filter, the plastic matter is guided by the interior wall of body 3 and passes through discharge line 10 which sends it toward duct 21 feeding die 4. When the first filter is clogged, which one can notice through an increase in pressure ahead of the filter, through a diminuation in the flow from the die, or when it has flowed for a fixed period of time, one proceeds to change the filter by an angular displacement of the barrel 5 of about 45°, bringing opposite one another the lines 11 and 20 on the one hand and 12 and 21 on the other. When this change is effected progressively, there is no discernible variation in the flow to the die. The left filter being thus withdrawn from the path of flow, one can remove its plug 13 and proceed to change its metallic cloth 8. This accomplished, the filter changing device is ready for a new cycle.

The device permits the maintaining of the filter unit to be put into service at a temperature scarcely less than that of the other filter without obliging one to resort to a source of heat other than the general heating of the filter body by heat from the material being extruded. The dimensions of the moveable equipment being reduced to a minimum, its movement is effected with a very small expenditure of energy and can even be effected with a hand lever or motor. This solution is extremely simple and costs very little.

What I claim is:

1. A filter changing device for the extrusion of plastic material comprising a filter body having an inlet line adapted to be connected to an extruder and an outlet line adapted to be connected to a die, said filter body having a cylindrical bore disposed with its axis perpendicular to said inlet and to said outlet lines, two cylindrical, axially spaced, coaxial filters lodged in said cylindrical bore, the two filters being provided with adjacent lines of feed and of discharge, permitting the introduction into the flow of plastic material or the removal from it of either of the two filters, characterized in that the two filters are machined in a cylinder of revolution and in that the input sections of the adjacent lines of feed and the output sections of the adjacent lines of discharge have their centers located essentially on the same right-hand section of the said cylinder of rotation, the said sections of input and of output corresponding to each of the filters, being respectively in such a manner as to coincide by angular displacement with the line of the filter body receiving the plastic material issuing from the extruder and, with the discharge line of the filter body, assuring the movement of the plastic material toward the die.

2. A filter changing device according to claim 1, characterized in that the carrying surfaces of the filter body of the cylinder of revolution comprising the two filters are limited to the end and median portions of the said cylinder, the run of flow of the plastic material having traversed the filters being thus partially delineated by the interior wall of the filter body.

3. A filter device for extrusion machines, comprising: a body having an inlet portion formed with an inlet line adapted to be connected to an extruder and an outlet portion formed with an outlet line adapted to be connected to a die; said body having a cylindrical bore formed therein, said inlet and outlet lines communicating with said cylindrical bore; a cylindrical filter housing rotatably mounted in said cylindrical bore in slidable sealing contact with said inlet and outlet lines, a pair of axially aligned chambers in said filter housing, said filter housing having a pair of inlet ports and a pair of outlet ports successively registering in sealing contact with said lines in said body upon rotation of said filter housing relative to said body; each chamber communicating with a different one of said inlet and outlet ports, a filter screen in each of said chambers in the path of flow from the inlet to the outlet ports thereof; and means for rotating said filter housing relative to said body between a first position in which only one of said inlet and only one of said outlet ports registers with said inlet and outlet lines respectively and a second position in which only the other one of said inlet and only the other one of said outlet ports registers with said inlet and outlet lines respectively.

4. A filter device according to claim 3 in which said inlet ports and said outlet ports in said filter housing are respectively separated by a relatively narrow land, and said inlet line is in communication with said pair of inlet ports and said outlet line is in communication with said pair of outlet ports during a mid-portion of travel of said filter housing as it is rotated between said first and said second positions.

5. A filter device according to claim 4 in which the ends of said filter housing are exposed for cleaning the filter device and closure means is removably mounted on the outer end of each of said chambers.

6. A filter device according to claim 5 in which said chambers are separated by a partition extending across the filter housing intermediate the opposite ends thereof and said inlet ports and said outlet ports are located in said partition.

7. A filter device according to claim 6 in which said closure means comprises a plug sealingly mounted in a counterbore formed in each end of said filter housing, and fastening means mounted on each end of said filter housing and engaging said plugs for removably holding them sealingly mounted in their respective counterbore.

8. A filter device according to claim 6 in which the interior wall of each of said axially aligned chambers is cylindrical, said screens are tubular and engage said interior walls and are removable and insertable through opposite ends of said filter housing.

* * * * *